W. C. BOWDEN.
ROLLING MACHINE FOR WORKING PLASTIC MATERIAL.
APPLICATION FILED JUNE 10, 1920.

Patented June 7, 1921.
2 SHEETS—SHEET 1.

INVENTOR:
William Clarence Bowden
By Attorneys,

W. C. BOWDEN.
ROLLING MACHINE FOR WORKING PLASTIC MATERIAL.
APPLICATION FILED JUNE 10, 1920.
1,380,632.
Patented June 7, 1921.
2 SHEETS—SHEET 2.
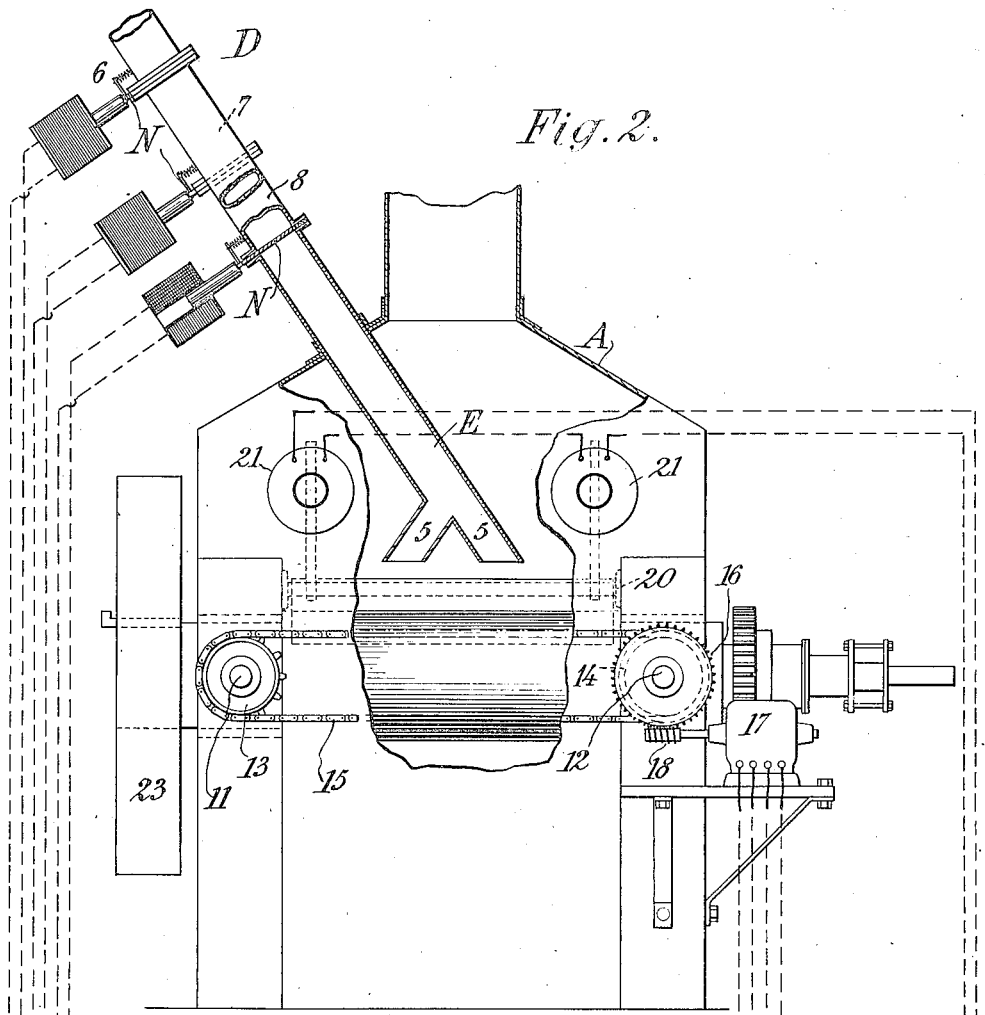
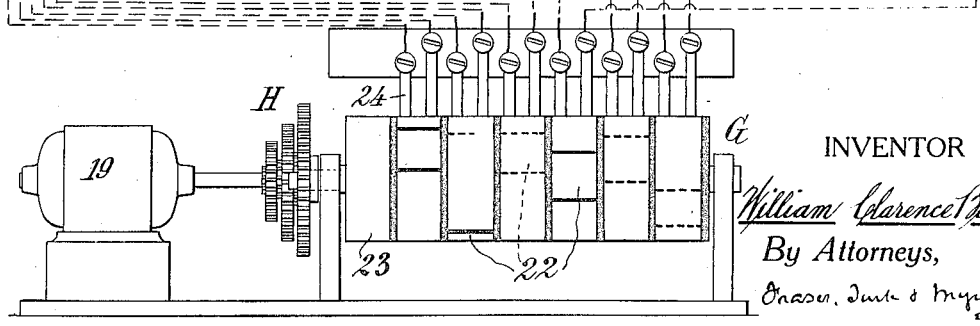
INVENTOR :
William Clarence Bowden
By Attorneys,

UNITED STATES PATENT OFFICE.

WILLIAM CLARENCE BOWDEN, OF MIDDLE VILLAGE, NEW YORK.

ROLLING-MACHINE FOR WORKING PLASTIC MATERIAL.

1,380,632.  Specification of Letters Patent.  Patented June 7, 1921.

Application filed June 10, 1920. Serial No. 388,046.

*To all whom it may concern:*

Be it known that I, WILLIAM C. BOWDEN, a citizen of the United States of America, residing in Middle Village, Long Island, county of Queens, State of New York, have invented certain new and useful Improvements in Rolling-Machines for Working Plastic Material, of which the following is a specification.

This invention relates to rolling or mixing machines, and its object is to provide a machine in which the operations are accomplished in a substantially automatic manner.

The apparatus illustrated in the accompanying drawings shows one form in which the invention may be embodied, such illustrated form being especially suitable for the production of thermoplastic compositions; although it may be used, either without modification or with slight modification, for many other purposes, as, for example, for the production of rubber compositions, hard rubber, gutta percha, button compositions, celluloid, insulating materials, valve packing, and porcelain mixtures.

In making phonograph record stock, it is customary to feed the several ingredients against a pair of rolls revolving together, one of which is heated, the rotation of the rolls effecting the commingling of the ingredients. At first, the revolving rolls are set close together, so that none of the ingredients pass between them, to give sufficient opportunity for a uniform distribution of the ingredients. After the ingredients are thoroughly incorporated, the rolls are slightly separated, so as to permit the mixture to pass between them, the sheet of material thus formed being gathered up on the heated roll. After the sheet has been gathered up, in the form of a cylindrical layer, a movable cutting member is advanced against the roll, to divide the layer, and is maintained in contact with the revolving roll until the roll has completed part of a revolution, thus separating one end of the cylindrical mass, and permitting one of the divided ends to fall down, while the other end still adheres to the roll. This pendant strip is reincorporated with the raw materials discharged and being discharged to the roll, by the continued rotation of the roll after the knife has been retracted. These operations have, heretofore, been manually performed, thus necessitating the employment of skilled labor, and requiring the exercise of judgment in proportioning the materials, and in determining the proper occurrence of the various operations relatively to each other.

The present invention is designed to obviate the possibilities of error through faulty judgment on the part of the operatives, by providing mechanism to render the foregoing operations automatic, thus obtaining a more uniform product, and effecting a considerable saving in cost of production.

In the drawings:—

Fig. 2 is a fragmentary side elevation of the apparatus shown in Fig. 1, with some of the elements partly in section;

Fig. 3 is a side elevation of the automatic controlling mechanism.

Figure 1:
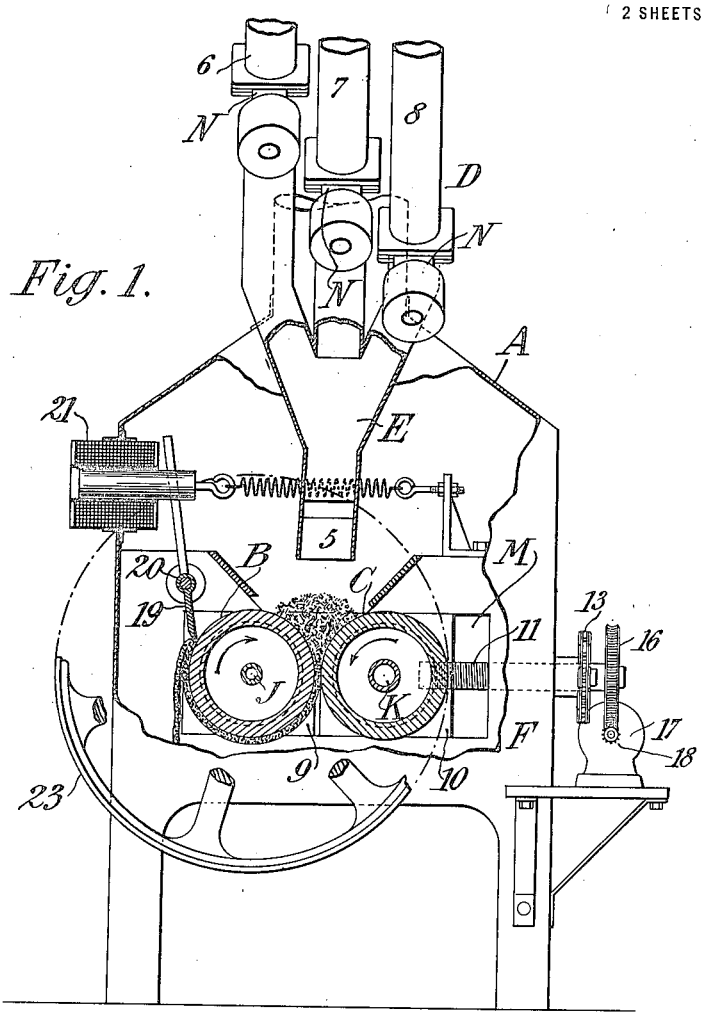
Figure 1 is a fragmentary end elevation of the apparatus, with some of the elements partly in section.

In the drawings, a casing or housing A is provided with a pair of coöperating rolls B and C, one of these rolls (B in the illustrated embodiment) preferably being in fixed bearings, while the other is so mounted as to permit a spacing of the rolls. The raw materials are at first prevented from passing between the rolls, so as to thoroughly incorporate and distribute the materials among each other. When a thorough incorporation is obtained, the rolls are slightly separated, so as to permit the mixture to pass between them. This separation is automatically accomplished, by mechanism to be described hereinafter.

The mechanism for feeding the raw material to the rolls is indicated, in its entirely, by D, and preferably comprises a main conveyer or conduit E having a lower bifurcated or Y end, forming two diverging outlets 5, 5, the diverging outlets being for the purpose of obtaining a wide distribution of the raw materials over the rolls. Manifestly, the same result might be accomplished in other ways; for example, by employing a chute having deflecting plates. A plurality of inlet conduits 6, 7 and 8 branch from the upper end of the main conduit E, and are each adapted to receive and conveniently convey one of the ingredients thereto.

The discharge of the raw materials through the inlet conduits is controlled so as to take place automatically; for example, by magnetically operated slide gates N, each being provided with any suitable means to maintain the gates closed. When the device is used for producing a thermoplastic record mass, three inlet conduits will, in general, be found suitable. Where the device is used for other purposes, the inlet conduits will, in general, equal the number of ingredients to be commingled. In practice, when a record mass is to be produced, the materials are initially distributed over rolls which are set very close together, so that a thorough mixing of them is obtained. As has already been indicated, the roll B is supported in stationary journal bearings now designated as 9; while the roll C is supported in movable journal bearings 10 to permit spacing of the rolls, the movable bearings being conveniently guided, for example, in elongated slots in the end walls. The spacing of the rolls can be conveniently accomplished by providing screws 11 and 12 so as to each engage one of the opposite journal bearings of the roll C. In order to synchronize and secure the movement of these journal bearings, each of the screws preferably carries at one end the sprocket wheels 13 and 14 respectively, connected by a sprocket chain 15, although, of course, any other suitable mechanism may be used to secure the synchronous rotation of the screws. A worm gear 16 is secured to the outer face or shaft of one of the sprocket wheels, and is driven by a motor 17 through the intervention of a worm 18. The operation of this motor is also regulated by a controlling mechanism to be described.

After the rolls have been spaced apart by the motor 17, and the material collected on the heated roll, it is necessary to reincorporate the partly incorporated mass with the raw materials, in order to insure uniformity in the product. A knife 19 is arranged to divide the collected layer, the knife being conveniently pivoted at 20, and its movement effected by energizing an electro magnet or magnets 21, which, by a suitable connection between its plunger and the pivoted knife, causes the latter to advance against the roll.

A controlling machine, indicated in its entirety by G, is preferably connected, through gear train H, with a suitable driving mechanism, for example, motor 19, or other constant speed rotor, and preferably takes the form illustrated, comprising a plurality of circuit closing contact strips 22, mounted on a rotatable drum 23, and insulated from each other. The circuit to the electro magnet of the element to be automatically operated, is closed at the requisite time by a contact strip 22, forming a conductive bridge across a pair of preferably adjacent brushes, which constitute the circuit terminals. By varying the circumferential length of the contact strips, the length of time during which the electro magnet controlling a given element will act may be varied; while the number of operations in one rotation of the drum may be varied, by increasing the number of contact strips 22, as will be readily understood. The gear train H, hereinbefore mentioned, forms a convenient means for reducing the relative speed of the drum, so that the drum may turn once for each cycle of operations. The roll B is shown as provided with heating means, as, for example, a steam inlet pipe J, while the roll C is shown as provided with cooling means, as a water inlet pipe K.

In operating the apparatus, each of the conduits 6, 7 and 8, leads from a hopper or bin containing the material to be discharged to the rolls, the slide gates N being closed. In order to provide for the variation in the proportions of the different ingredients, the slide gates may be opened for longer or shorter times, as determined by the circuit closing contacts on the drum 23.

In using the device for making thermoplastic record masses, the raw ingredients, that is, the binder, the clay and the filler are led into the proper chutes, from their supplying hoppers. The rolls (the movable roll being set so that its outer surface is in contact with the outer surface of the nonadjustable roll) are then set in motion, as by a belt on pulley 23 at suitable speed. As the drum of the controlling device G is simultaneously rotated by a motor, the contact strips 22 are successively brought into engagement with their pairs of brushes 24, thus closing the circuits to the magnets controlling the operation of the various elements. Conveniently, and for the purpose of simplifying the description, the first three circuit closing elements (toward the left when viewed as in Fig. 3) are employed to operate the slide gates N which control the conduits through which the raw materials pass to the rolls. Each contact element, as has already been indicated, contacts with its pair of brushes so as to close the circuit. Inasmuch as it is desirable to deliver the materials to the rolls in succession, rather than simultaneously, in general, the operation of the gates will be so arranged as to occur at different times, and this result will be obtained by locating the contact strips in different portions of the drum.

Initially, the rolls B and C, as has been already indicated, are set close together, so as to prevent the raw materials from passing therebetween, and remain so until the materials have all been deposited on the rolls, by the opening of slide gates N, and thoroughly incorporated. As the fifth contact element of the controlling machine is engaged by its pair of brushes, the circuit to the motor 17 is closed, setting the latter in operation and causing the worm and worm gear to rotate the sprocket chain, thereby rotating the screws 11 and 12, and causing the movable journal bearings of the roll C to move away from the roll B, and thus provide the requisite clearance between the rolls. The material, which has been fairly commingled by this time, is carried around the hot roll B until the fourth circuit closing contact element of the controlling machine closes the circuit to operate the knife edge 21, thus dividing the thermoplastic mass clinging to the hot roll B. The knife is periodically advanced against the heated roll for such a length of time that a portion of the strip of plastic material remains adhering to the heated roll while the other end is pendent, and, when the knife is retracted, this pendant strip is again carried to such a position as to mix with the material massed on the rolls. By the repetition of these operations a very uniform product is eventually obtained. Finally after the mixture has been thoroughly incorporated, the knife will be held against the roll for a complete revolution, thus freeing the batch from the roll. This freed batch may be passed through the usual rollers and the blanking machines. The sixth contact element then preferably reverses the motor 17, bringing the rolls together to their initial position, to repeat the cycle of operations.

It is quite evident that various modifications may be made in the details of the means for controlling the operation of the elements, without departing from the spirit of the invention or the scope of the appended claims. For instance, the controlling drum may have a plurality of cams adapted to actuate mechanical elements controlling the operations hereinbefore enumerated, instead of the electrical contact elements shown.

What I claim is:—

1. In a rolling machine, the combination of coöperating rolls and mechanism for automatically varying the spacing of the rolls.

2. In a rolling machine, the combination of coöperating rolls and mechanism for periodically closing together and separating the rolls.

3. In a rolling machine the combination of coöperating rolls, means for rotating said rolls, and mechanism for varying the spacing of the rolls from each other in synchronized relation with the rotating means.

4. In a machine for rolling thermoplastic materials, the combination of a plurality of rolls, one of which is heated, mechanism for rotating said rolls and means in synchronized relation with the roll actuating mechanism for varying the spacing of the rolls from each other.

5. In a machine for rolling thermoplastic materials, the combination of a plurality of coöperating rolls, one of which is heated, mechanism for rotating said rolls, and means, comprising a pair of movable journal bearings to periodically move the rolls toward or from each other.

6. In a machine for rolling thermoplastic materials, the combination of coöperating rolls, and timed means to periodically control the delivery of raw materials to the rolls.

7. In a rolling machine, the combination of coöperating rolls, a plurality of conveyers adapted to discharge raw materials onto said rolls, and means to automatically regulate the discharge of materials from said conveyers.

8. In a rolling machine, the combination of coöperating rolls, a dividing member and mechanism to move said member periodically to separate part of the material from the roll on which it is collected.

9. In a machine for rolling plastic material, the combination of coöperating rolls, a dividing member and mechanism to move said member to intermittently separate part of the material from the roll on which it is collected, and to leave part adhering to the roll.

10. In a machine for rolling plastic materials, the combination of coöperating rolls, mechanism for rotating said rolls, mechanism for varying the spacing of the rolls from each other, and means to discharge one of a plurality of materials on to said rolls.

11. In a machine for rolling plastic materials, the combination of coöperating rolls, a plurality of means for discharging materials thereto, means for periodically spacing the rolls, a dividing member to separate material adhering to a roll, and controlling means adapted to operate said discharging means, spacing means, and dividing means to compound a mixture of prescribed ingredients, to commingle the same to homogeneity, to recommingle the same and finally to sever and discharge the mixture.

In witness whereof, I have hereunto signed my name.

WILLIAM CLARENCE BOWDEN.